(12) United States Patent
Pollack et al.

(10) Patent No.: US 10,587,164 B2
(45) Date of Patent: Mar. 10, 2020

(54) SPHERICAL FLYWHEEL BATTERY AND STORAGE DEVICE

(71) Applicants: Jonathan Edward Pollack, Deerfield, IL (US); Steven Lawrence Pollack, Deerfield, IL (US)

(72) Inventors: Jonathan Edward Pollack, Deerfield, IL (US); Steven Lawrence Pollack, Deerfield, IL (US)

( * ) Notice: Subject to any disclaimer, the term of this patent is extended or adjusted under 35 U.S.C. 154(b) by 211 days.

(21) Appl. No.: 15/511,178

(22) PCT Filed: Sep. 21, 2015

(86) PCT No.: PCT/US2015/051235
§ 371 (c)(1),
(2) Date: Mar. 14, 2017

(87) PCT Pub. No.: WO2016/108969
PCT Pub. Date: Jul. 7, 2016

(65) Prior Publication Data
US 2017/0353077 A1    Dec. 7, 2017

Related U.S. Application Data

(60) Provisional application No. 62/099,540, filed on Jan. 4, 2015.

(51) Int. Cl.
| | | |
|---|---|---|
| *H02K 7/00* | (2006.01) |
| *H02K 7/02* | (2006.01) |
| *F16F 15/315* | (2006.01) |
| *F16C 19/50* | (2006.01) |
| *H02K 7/09* | (2006.01) |
| *H02K 11/00* | (2016.01) |

(52) U.S. Cl.
CPC .......... *H02K 7/025* (2013.01); *F16C 19/502* (2013.01); *F16F 15/315* (2013.01); *H02K 7/09* (2013.01); *H02K 11/0094* (2013.01); *F16C 2380/28* (2013.01); *Y02E 60/16* (2013.01)

(58) Field of Classification Search
CPC ............ H02K 7/02; H02K 7/025; H02K 7/08; H02K 7/18; H02K 7/09; Y02E 60/16; F16F 15/30; F16F 15/315; H20K 7/00
See application file for complete search history.

(56) References Cited

U.S. PATENT DOCUMENTS

| | | | |
|---|---|---|---|
| 3,436,572 A | 4/1969 | Storsand |
| 5,462,402 A | 10/1995 | Bakholdin et al. |
| 5,708,312 A | 1/1998 | Rosen et al. |
| 6,175,172 B1 * | 1/2001 | Bakholdin | B62M 1/10 310/74 |
| 6,232,672 B1 | 5/2001 | Gottfired, Jr. |
| 6,794,777 B1 | 9/2004 | Fradella |
| 8,853,977 B1 | 10/2014 | Gottfried |
| 2005/0040776 A1 * | 2/2005 | Sibley | F16F 15/3153 318/150 |

OTHER PUBLICATIONS

PCT/US2015/051235 International Search Report dated Jan. 21, 2016.

* cited by examiner

*Primary Examiner* — Jermele M Hollington
*Assistant Examiner* — Leda T Pham
(74) *Attorney, Agent, or Firm* — Perkins Coie LLP

(57) ABSTRACT

The present disclosure provides flywheel systems for generating and/or storing energy, and methods of using same.

16 Claims, 1 Drawing Sheet

SPHERICAL FLYWHEEL BATTERY AND STORAGE DEVICE

PRIORITY CLAIM

This application is a 371 U.S. National Stage Application of International Patent Application No. PCT/US2015/051235 filed Sep. 21, 2015, which claims priority to U.S. Provisional Patent Application Ser. No. 62/099,540, filed Jan. 4, 2015, the entire contents of which are incorporated herein by reference and relied upon.

TECHNICAL FIELD

The present disclosure relates to flywheel devices for generating and/or storing energy, and methods of using same.

BACKGROUND

Many vehicle applications avoid the use of energy flywheel systems due, in large part, to the structural complications introduced by inertial counter-forces imparted on the systems from the vehicle's changes in yaw, pitch and/or roll.

Many energy flywheel systems include one or more components that are rotationally mounted within a housing assembly. These components, which may be referred to as the rotating group, include, for example, an energy storage flywheel, a motor/generator, and a shaft. In particular, the energy storage flywheel and motor/generator may be mounted on the shaft, which may in turn be rotationally supported via one or more bearing assemblies, mounted to the housing assembly.

When an energy flywheel system is being transported, rotational events, occur that are not along the axis of the rotational group. These events may cause the energy flywheel system to experience stresses, both internally and externally (e.g., about any of the bearing assemblies, or along any mounts or joints connecting the energy flywheel system to the transported vehicle). As a result, the rotating group can be damaged, which can shorten the effective life of the energy flywheel system, shorten the effective life of the joints attaching the energy flywheel system to the vehicle, and/or can increase system costs.

Hence, there is a need for a system and method for allowing the rotating group in an energy flywheel system to rotate freely, without damaging itself or its surroundings, while simultaneously being able to extract the energy stored within.

SUMMARY

The present disclosure provides devices for generating and/or storing energy, and methods of using same. In particular, the present disclosure provides devices that enable safe and efficient use of energy flywheel systems in moving vehicles despite inertial counter-forces imparted on the energy flywheel system from the vehicle's changes in yaw, pitch and/or roll.

In one embodiment, the present disclosure provides an energy device comprising a spherical housing, at least one flywheel assembly support in contact with an inner surface of the spherical housing, a flywheel assembly rotatably engaged with the at least one flywheel support, at least one motor generator support in contact with the inner surface of the spherical housing, a motor generator assembly secured by the at least one motor generator support, an actuator rotatably engaged with the motor generator assembly, and a closeable interface between the flywheel assembly and the actuator; a device housing including the spherical housing, an inner surface, and an outer surface; and at least one bearing assembly including a support conduit in contact with the inner surface of the device housing, and a ball bearing rotatably engaged with the support conduit and in contact with the outer surface of the spherical housing.

In another embodiment, the present disclosure provides a method of generating electricity, the method comprising providing an energy generating device comprising a spherical housing including a conductive inner surface and an outer surface, at least one flywheel assembly support in contact with the inner surface, a flywheel assembly rotatably engaged with the at least one flywheel support, at least one motor generator support in contact with the inner surface, a motor generator assembly secured by the at least one motor generator support and in electrical communication with the inner surface of the spherical housing, an actuator rotatably engaged with the motor generator assembly and in mechanical communication with the inner surface of the spherical housing, and a closeable interface between the flywheel assembly and the actuator, a device housing including the spherical housing, an inner surface, and an outer surface, and at least two conductive bearing assemblies, wherein each conductive bearing assembly includes a support conduit in mechanical and electrical communication with the inner surface of the device housing, and an electrically conductive ball bearing rotatably engaged with the support conduit and in electrical and mechanical contact with the outer surface of the spherical housing; and causing the actuator to close the closeable interface such that the flywheel assembly is in mechanical communication with the actuator.

These and other embodiments of the present disclosure will be disclosed in further detail herein below.

DETAILED DESCRIPTION

Generally, an energy device consistent with the present disclosure includes a flywheel assembly and a motor generator assembly in a spherical housing, the spherical housing is secured in a device housing such that the spherical housing can freely rotate in any direction within the device housing without loss of electrical connectivity between the motor generator and the device housing. This allows the flywheel assembly to move in response to changes in the device housing's position (e.g., changes in yaw, pitch and/or roll) without damaging the rotating flywheel assembly from the resulting inertial change. The flywheel assembly and the motor generator assembly are selectively engageable with each other. The device can be operated as an electrical generator, as an electrical storage device, or in a neutral "free-wheel" mode, as selected by a user.

1. Energy Devices

Figure 1:
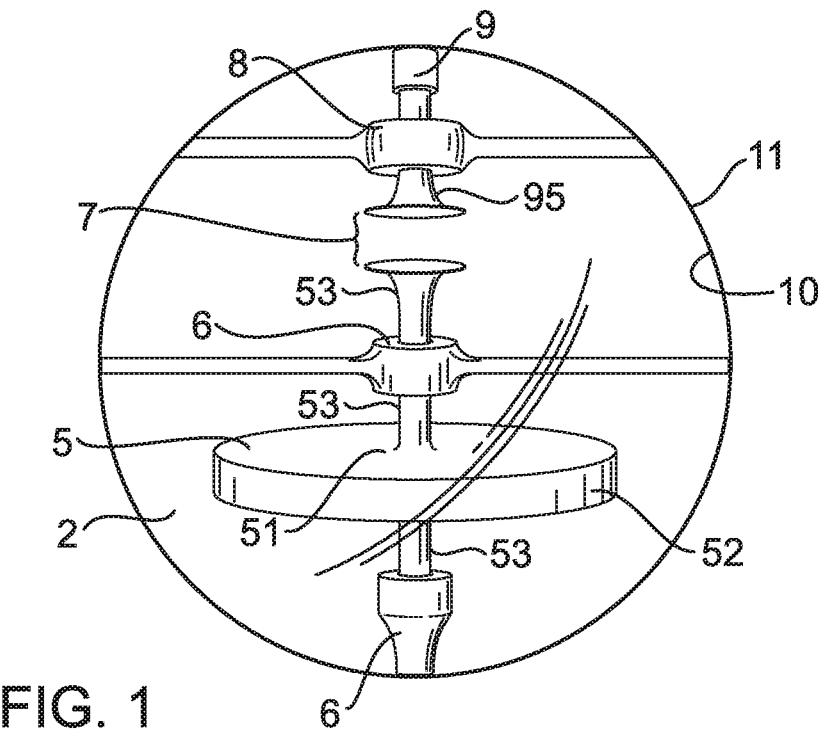
FIG. 1 shows a spherical flywheel battery and storage device consistent with the present disclosure.
Figure 2:
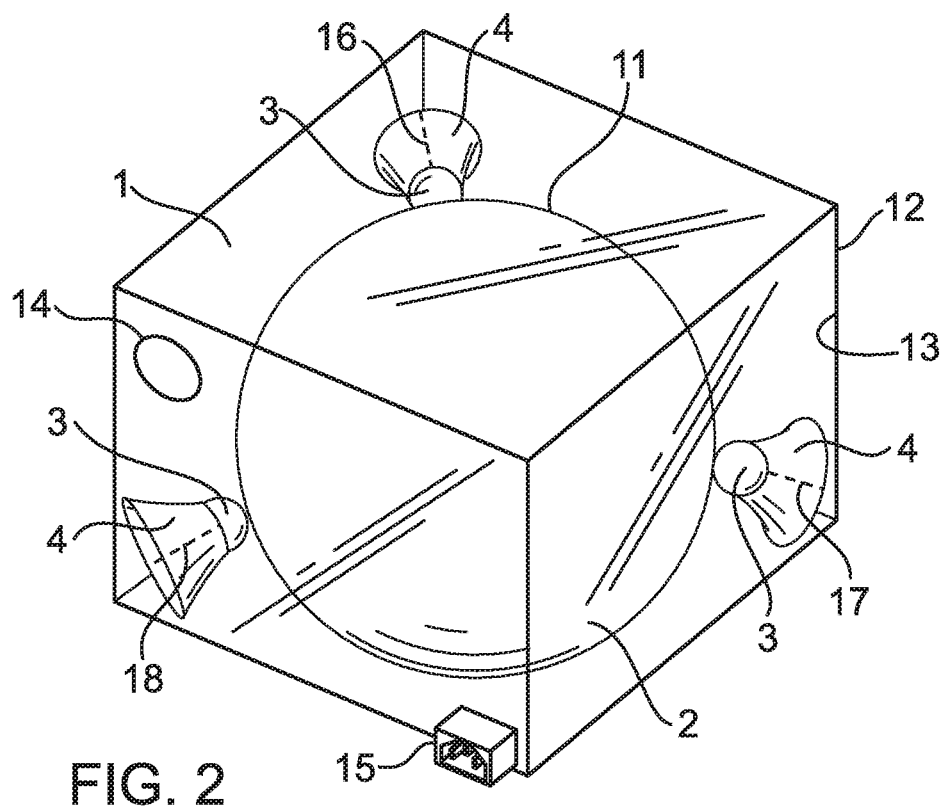
FIG. 2 shows a spherical flywheel battery and storage device consistent with the present disclosure, such as that shown in FIG. 1, secured in a device housing consistent with the present disclosure.

Referring now to the exemplary embodiment shown in FIGS. 1-2, an energy device consistent with the present disclosure comprises a spherical housing 2, a device housing 1, and at least one bearing assembly 3,4 for enabling the spherical housing 2 to rotate freely within the device housing 1 while maintaining electrical communication between the device housing 1 and the spherical housing 2.

The spherical housing 2 is constructed of a conductive material and includes an inner surface 10 and an outer surface 11. A flywheel assembly 5 is housed inside the spherical housing 2. The flywheel assembly 5 may be formed of any suitable material. In some embodiments, the flywheel assembly 5 is constructed of a material having a high strength-to-destiny ratio such as, for example, carbon-fiber-reinforced plastic. The flywheel assembly 5 may adopt any shape or configuration. In some embodiments, the flywheel assembly 5 may be a solid shape, a spoke-type configuration, or a combination thereof.

In some embodiments, the spherical housing 2 includes a gas. In some embodiments, gas is at a reduced pressure (e.g., compared to ambient pressure) in order to reduce loss of energy (e.g., rotational momentum) due to friction, for example friction between the flywheel assembly 5 and the gas.

In some embodiments, the flywheel assembly 5 includes a hub 51, a rim 52 and a shaft 53. The rim portion 52 surrounds the hub portion 51, which surrounds the shaft 53. In such embodiments, the hub 51 may be formed of a high-strength metal alloy.

At least one flywheel assembly support 6 is in contact with the inner surface 10 of the spherical housing 2 and supports the flywheel assembly 5, enabling it to rotate within the spherical housing 2. In some embodiments, the flywheel assembly support(s) 6 include magnetic bearings.

A motor generator assembly 8 is also housed within the spherical housing 2. The motor generator assembly 8 may include a motor generator support that is in contact with the inner surface 10 of the spherical housing and supports the motor generator. An actuator assembly 9 is rotatably engaged with the motor generator assembly 8, and extends from the inner surface 10 of the spherical housing 2 towards the flywheel assembly 5. The actuator assembly 9 includes an extendable feature 95 such as a solenoid, a motor-driven jackscrew, or a motor-driven piston. If the extendable feature 95 includes a solenoid, the solenoid may be any type of solenoid, such as a latch-type solenoid.

A closeable interface 7 is formed between the actuator assembly 9 and the flywheel assembly 5 when the extendable feature is in a retracted position. The closeable interface 7 can be closed when the extendable feature 95 of actuator assembly 9 is activated and in an extended position.

In embodiments wherein the extendable feature 95 of the actuator assembly 9 includes a solenoid, such as a latch-type solenoid, the actuator assembly 9 can cause the closeable interface 7 to close when an electrical signal having a first polarity is provided to the extendable feature 95 (i.e., the solenoid). The actuator assembly 9 can cause the closeable interface 7 to open in such embodiments when an electrical signal having the opposite polarity of the first electrical signal is provided to the extendable feature 95 (i.e., the solenoid). Opening the closeable interface 7 interrupts the mechanical engagement between the rotating flywheel assembly 5 and the motor generator assembly 8.

When in a closed configuration, the terminus of the extendable feature 95 of the actuator assembly 9 engages mechanically with the terminus of the flywheel assembly 5. In some embodiments, each terminus includes a gear, each of which meshes with the other. In other embodiments, the termini engage through a clutch-plate assembly.

The device housing 1 surrounds the spherical housing 2, and includes an inner surface 13 and an outer surface 12. The device housing 1 includes at least one bearing assembly 3,4 and typically at least four bearing assemblies 3,4 for supporting the spherical housing 2 within the device housing 1 such that the spherical housing 2 is not directly in contact with the inner surface 13 of the device housing 1. Typically, two of the bearing assemblies 3,4 conduct charge. Optionally, a third bearing assembly 3,4 is connected to ground, for example by a ground lead 16 included in a bearing assembly 3,4 and in electrical communication with both the bearing 3 and the device housing 1.

The device housing 1 may be of any suitable size and shape necessary to enclose the spherical housing 2. In some embodiments, such as those shown in FIGS. 1-2, the device housing 1 adopts a cube shape. In other embodiments, the device housing 1 adopts a rectangular box shape. In still other embodiments, the device housing 1 adopts a polyhedron shape, such as a regular tetrahedron, a regular polyhedral prism, a hollow platonic solid (e.g., a tetrahedron, a cube, an octahedron, a dodecahedron, an icosahedron, etc.), a hollow Archimedes solid (e.g., a truncated tetrahedron, a cuboctahedron, a truncated cube, a truncated octahedron, a rhombicuboctahedron, a truncated cuboctahedron, a snub cube, an icosidodecahedron, a truncated dodecahedron, etc.), a hollow Catalan solid, also referred to as a hollow Archimedean dual (e.g., a triakis tetrahedron, a triakis octahedron, a disdyakis dodecahedron, a tetrakis hexahedron, etc.), a deltahedron such as a convex deltahedron (e.g., a tetrahedron, an octahedron, an icosahedron, a triangular bipyramid, a pentagonal bipyramid, a snub disphenoid, a triaugmented triangular prism or a gyroelongated square bipyramid), or a hollow circumscribable Johnson solid (e.g., a J37 rhombicuboctahedron, a J34 icosidodecahedron, a J72 rhombicosidodecahedron, etc.). Alternatively, the device housing 1 adopts an irregular configuration while the bearing assemblies 3,4 (discussed in more detail below) are configured and arranged such that the ball bearings 3 are located on the surface of an imaginary sphere that shares a common origin (e.g., center point) with the spherical housing 2.

Each bearing assembly 3,4 includes a support conduit 4 in contact with the inner surface 13 of the device housing 1, and a ball bearing 3. The ball bearing 3 is rotatably engaged with the support conduit 4, and is also in contact with the outer surface 11 of the spherical housing 2. The bearing assemblies 3,4 enable the spherical housing 2 to rotate freely within the device housing 1 (i.e., in any direction relative to the device housing 1).

Two of the bearing assemblies 3,4 in each device housing 1 also enable the spherical housing 2 to be in electrical communication with the device housing 1. In some embodiments, the conductive bearing assemblies 3,4 each include a ball bearing 3 formed of a conductive material, or alternatively coated with a conductive material, such that electrical signal can pass from the outer surface of the spherical housing 2 to the support conduit 4 via the ball bearing 3. In some embodiments, more than two, or all, of the ball bearings 3 are conductive.

Two of the bearing assemblies 3,4, also include support conduits 4 that enable electrical signal to pass from the conductive ball bearing 3 to the device housing 1. In some embodiments, the conductive support conduit 4 itself is formed of a conductive material, or alternatively is coated in a conductive material, such that electrical signal can pass from the ball bearing 3 to the device housing 1. In other embodiments, the support conduit 4 includes an electrical lead 17,18 in electrical communication with the ball bearing 3 and the device housing 1. In such embodiments, one electrical lead 17 may serve as a positive lead while the other lead 18 may serve as a negative lead. The remaining bearing assemblies 3,4 do not enable electrical signal to pass from the ball bearing 3 to the device housing 1. For example, non-conductive bearing assemblies 3,4 may be formed of a non-conducting material (e.g., an insulator) or may not include an electrical lead 17,18 in electrical communication with the ball bearing 3 and the device housing 1.

In one embodiment, the device housing 1 includes four bearing assemblies 3,4, wherein the four bearing assemblies 3,4 are located in alternating corners (e.g., vertices) of the device housing 1. In such an embodiment, the four bearing assemblies 3,4 are arranged in a tetrahedral configuration with respect to each other, such that each ball bearing 3 is equidistant from the geometric center of the spherical housing 2 and optionally equidistant from each other.

In another embodiment, the device housing 1 includes six bearing assemblies 3,4. In such an embodiment, the bearing assemblies 3,4 may be located in any configuration suitable to stabilize the spherical housing 2. In one embodiment, one bearing assembly 3,4 is located on each face of the device housing 1, for example if the device housing 2 is in a cube or rectangular box configuration.

In another embodiment, one bearing assembly 3,4 is located on each of four edges of a cube or rectangular box shaped device housing 1, and two bearing assemblies 3,4 are located on opposing faces orthogonal to the four edges. In such embodiments, all six bearing assemblies 3,4 are configured and arranged such that the six ball bearings 3 are equidistant from the geometric center of the spherical housing 2. For example, all six bearing assemblies 3,4 may be of identical size and shape if the device housing 1 is a cube shape and the six bearing assemblies 3,4 are each located on a respective face of the inner surface of the cube-shaped device housing 1. Alternatively, the four edge bearing assemblies 3,4 may be identical in size and shape and the two facial bearing assemblies 3,4 may be identical in size and shape to each other but dissimilar in size and shape from the edge bearing assemblies 3,4 if the device housing 1 is not a cube shape or other regular 3-dimensional polygon.

In some embodiments, the device housing 1 includes a gas. In some embodiments, gas is at a reduced pressure (e.g., compared to ambient pressure) in order to reduce undesirable arcing between the spherical housing 2 and the inner wall 13 of the device housing 1 and/or to reduce errant current conduction between the ball bearing 3 and the support conduit 4. In other embodiments, the device housing 1 includes an inert gas, such as Argon, at ambient or reduced pressure. Reducing the pressure inside the device housing 1 may be accomplished by any suitable means. In some embodiments, for example, the device housing 1 includes a port 14 that may be connected to a vacuum source (e.g., a vacuum pump) for reducing the gas pressure.

In some embodiments, the device housing 1 further includes an electrical connection 15 for connecting one or more electrical leads 17,18 to the device housing 1. In such embodiments, electrical leads 17,18 may be connected to the electrical connection 15 to input electrical current to and/or export electrical current from the device housing 1. In some embodiments, electrical leads 17,18 may also be connected to the electrical connection 15 to input electrical signals of any desired polarity to the actuator assembly 9 (e.g., to a solenoid) in order to cause the closeable interface 7 to open or close as desired.

2. Methods

In some embodiments, the present disclosure provides a method of generating electricity. In some embodiments, the method comprises providing an energy generating device, causing a flywheel assembly of the device to rotate, and causing an actuator to close a closeable interface between the flywheel assembly and a motor generator assembly to generate electricity in the motor generator assembly from the rotation of the flywheel assembly with respect to the motor assembly. In some embodiments, the spherical housing includes a conductive inner surface and an outer surface, at least one flywheel assembly support in contact with the inner surface, a flywheel assembly rotatably engaged with the at least one flywheel support, at least one motor generator support in contact with the inner surface, a motor generator assembly secured by the at least one motor generator support and in electrical communication with the inner surface of the spherical housing, an actuator rotatably engaged with the motor generator assembly and in mechanical communication with the inner surface of the spherical housing, and a closeable interface between the flywheel assembly and the actuator. The device housing includes the spherical housing, an inner surface, and an outer surface, and at least two conductive bearing assemblies. The conductive bearing assemblies each include a support conduit in mechanical and electrical communication with the inner surface of the device housing, and an electrically conductive ball bearing rotatably engaged with the support conduit and in electrical and mechanical contact with the outer surface of the spherical housing. In some embodiments, the energy generating device is consistent with that shown in FIGS. 1-2.

In some embodiments, the method further comprises causing the actuator to close the closeable interface to cause the motor generator assembly to begin generating electricity. In some embodiments, closing the closeable interface comprises providing an electrical signal having a given polarity to the solenoid.

In some embodiments, the method further comprises causing the actuator to open the closeable interface to cause the motor generator assembly to stop generating electricity. In some embodiments, opening the closeable interface comprises providing an electrical signal having a second polarity (e.g., opposite polarity than the polarity required to close the closeable interface) to the solenoid.

In another embodiment, the present disclosure provides a method of storing energy. In some embodiments, the method comprises providing an energy storing device, causing an actuator to close a closeable interface between the flywheel assembly and a motor generator assembly, and causing a motor generator to impart rotation to the flywheel assembly of the device through the closed interface. The energy is thus stored as rotational momentum in the flywheel. In some embodiments, the motor generator imparts rotation to the flywheel assembly by causing the actuator to spin in response to electrical current flowing through the motor generator assembly. In some embodiments, the spherical housing includes a conductive inner surface and an outer surface, at least one flywheel assembly support in contact with the inner surface, a flywheel assembly rotatably engaged with the at least one flywheel support, at least one motor generator support in contact with the inner surface, a motor generator assembly secured by the at least one motor generator support and in electrical communication with the inner surface of the spherical housing, an actuator rotatably engaged with the motor generator assembly and in mechanical communication with the inner surface of the spherical housing, and a closeable interface between the flywheel assembly and the actuator. The device housing includes the spherical housing, an inner surface, and an outer surface, and at least two conductive bearing assemblies. The conductive bearing assemblies each include a support conduit in mechanical and electrical communication with the inner surface of the device housing, and an electrically conductive ball bearing rotatably engaged with the support conduit and in electrical and mechanical contact with the outer surface of the spherical housing. In some embodiments, the energy generating device is consistent with that shown in FIGS. 1-2.

In some embodiments, the method further comprises causing the actuator to close the closeable interface to cause the flywheel to rotate in response to rotation of the actuator assembly. In some embodiments, closing the closeable interface comprises providing an electrical signal having a given polarity to the solenoid.

In some embodiments, the method further comprises causing the actuator to open the closeable interface to cause the flywheel assembly to disengage from the actuator assembly. In this configuration, electrical current flowing through the motor generator may still cause the actuator to rotate, but the rotation of the actuator no longer imparts rotational motion to the flywheel assembly. In some embodiments, opening the closeable interface comprises providing an electrical signal having a second polarity (e.g., opposite polarity than the polarity required to close the closeable interface) to the solenoid.

From the foregoing, it will be appreciated that specific embodiments of the invention have been described herein for purposes of illustration, but that various modifications may be made without deviating from the scope of the invention. For example, one of ordinary skill in the art will recognize that the technology described herein need not be limited for use in a terrestrial vehicle; any moving body that may impart inertial forces from changes in momentum may benefit from use of the technology disclosed herein. Accordingly, the invention is not limited except as by the appended claims.

We claim:

1. An energy device comprising:
   a spherical housing including:
      an inner surface and an outer surface,
      at least one flywheel assembly support in contact with the inner surface,
      a flywheel assembly rotatably engaged with the at least one flywheel assembly support,
      at least one motor generator support in contact with the inner surface,
      a motor generator assembly secured by the at least one motor generator support,
      an actuator rotatably engaged with the motor generator assembly, and
      a closeable interface between the flywheel assembly and the actuator;
   a device housing including the spherical housing, an inner surface, and an outer surface; and
   at least one bearing assembly including:
      a support conduit in contact with the inner surface of the device housing, and
      a ball bearing rotatably engaged with the support conduit and in contact with the outer surface of the spherical housing.

2. The energy device of claim 1, wherein the at least one bearing assembly is configured to enable the spherical housing to rotate freely within the device housing.

3. The energy device of claim 1, wherein the energy device includes at least three bearing assemblies.

4. The energy device of claim 1, wherein the device housing is in electrical communication with the spherical housing through the at least one bearing assembly.

5. The energy device of claim 1, wherein the spherical housing includes a gas at a gas pressure that is less than ambient air pressure.

6. The energy device of claim 1, wherein the closeable interface is closed in a first configuration such that the flywheel assembly is in mechanical communication with the actuator.

7. The energy device of claim 6, wherein the closeable interface is open in a second configuration such that the flywheel assembly is not in mechanical communication with the actuator.

8. The energy device of claim 1, wherein the actuator causes the closeable interface to close to define a first configuration such that the flywheel assembly is in mechanical communication with the actuator and the flywheel assembly causes the actuator to rotate with respect to the motor generator assembly.

9. The energy device of claim 1, wherein the actuator causes the closeable interface to close to define a first configuration such that the flywheel assembly is in mechanical communication with the actuator and the motor generator assembly causes the actuator and the flywheel to rotate with respect to the motor generator assembly.

10. The energy device of claim 1, wherein the actuator causes the closeable interface to open to define a second configuration such that the flywheel is not in mechanical communication with the actuator and wherein the flywheel does not cause the actuator to rotate with respect to the motor generator assembly.

11. The energy device of claim 1, wherein the actuator includes a solenoid.

12. The energy device of claim 11, wherein the solenoid is a latch-type solenoid.

13. A method of generating electricity, the method comprising:
   providing an energy generating device comprising:
      a spherical housing including:
         a conductive inner surface and an outer surface,
         at least one flywheel assembly support in contact with the inner surface,
         a flywheel assembly rotatably engaged with the at least one flywheel assembly support,
         at least one motor generator support in contact with the inner surface,
         a motor generator assembly secured by the at least one motor generator support and in electrical communication with the inner surface of the spherical housing,
         an actuator rotatably engaged with the motor generator assembly and in mechanical communication with the inner surface of the spherical housing, and
         a closeable interface between the flywheel assembly and the actuator,
      a device housing including the spherical housing, an inner surface, and an outer surface, and
      at least two conductive bearing assemblies, wherein each conductive bearing assembly includes:
         a support conduit in mechanical and electrical communication with the inner surface of the device housing, and
         an electrically conductive ball bearing rotatably engaged with the support conduit and in electrical and mechanical contact with the outer surface of the spherical housing; and causing the actuator to close the closeable interface such that the flywheel assembly is in mechanical communication with the actuator.

14. The method of claim 13, wherein the actuator includes a solenoid, and wherein the step of causing the actuator to close the closeable interface comprises providing an electrical signal having a first polarity to the solenoid.

15. The method of claim 14 further comprising causing the actuator to open the closeable interface to stop generating electricity.

16. The method of claim 15, wherein the step of causing the actuator to open the closeable interface comprises providing an electrical signal having a second polarity to the solenoid, wherein the second polarity is opposite from the first polarity.

* * * * *